(12) United States Patent
Hong et al.

(10) Patent No.: US 7,911,548 B2
(45) Date of Patent: Mar. 22, 2011

(54) ELECTRICALLY-DRIVEN LIQUID CRYSTAL LENS AND STEREOSCOPIC DISPLAY DEVICE USING THE SAME

(75) Inventors: Hyung Ki Hong, Seoul (KR); Hee Jin Im, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 187 days.

(21) Appl. No.: 12/314,597

(22) Filed: Dec. 12, 2008

(65) Prior Publication Data

US 2009/0190049 A1 Jul. 30, 2009

(30) Foreign Application Priority Data

Dec. 14, 2007 (KR) .................. 10-2007-0131155

(51) Int. Cl.
*G02F 1/13* (2006.01)
*G02F 1/1335* (2006.01)
(52) U.S. Cl. .................. 349/15; 359/376; 349/200
(58) Field of Classification Search .............. 359/251, 359/252, 253, 254, 376, 377, 378; 349/11, 349/15, 16, 77, 200; 345/95, 96
See application file for complete search history.

(56) References Cited

U.S. PATENT DOCUMENTS

| 6,191,881 | B1 * | 2/2001 | Tajima ............... 359/254 |
| 7,307,672 | B2 | 12/2007 | Feenstra et al. |
| 7,714,946 | B2 * | 5/2010 | Hong et al. ............... 349/15 |
| 2003/0063186 | A1 * | 4/2003 | Tomono ............... 348/51 |
| 2004/0169630 | A1 * | 9/2004 | Ide ................... 345/96 |
| 2006/0098296 | A1 * | 5/2006 | Woodgate et al. ............ 359/642 |
| 2006/0146208 | A1 | 7/2006 | Kim |
| 2006/0164593 | A1 | 7/2006 | Peyghambarian et al. |
| 2006/0273284 | A1 | 12/2006 | Hirose |
| 2007/0139333 | A1 | 6/2007 | Sato et al. |
| 2007/0183293 | A1 | 8/2007 | Murata et al. |
| 2007/0195410 | A1 | 8/2007 | Yun et al. |
| 2010/0195190 | A1 * | 8/2010 | Ishioka et al. ................ 359/316 |

FOREIGN PATENT DOCUMENTS

CN 101025490 8/2007

* cited by examiner

*Primary Examiner* — Akm E Ullah
(74) *Attorney, Agent, or Firm* — McKenna Long & Aldridge LLP

(57) ABSTRACT

An electrically-driven liquid crystal lens, which can be switched between a convex lens and a concave lens by changing an optical path difference based on an electric field application, and a stereoscopic display device using the same are disclosed. The electrically-driven liquid crystal lens includes first and second substrates arranged opposite each other and each defining a plurality of lens regions, a plurality of first electrodes formed on the first substrate based on the lens region and spaced apart from one another, a second electrode formed over the entire surface of the second substrate, a liquid crystal layer filled between the first substrate and the second substrate, first and second voltage sources to apply different voltages to the plurality of first electrodes in each lens region, the first and second voltage sources providing the liquid crystal layer between the first and second substrates with a convex lens optical path difference and a concave lens optical path difference, respectively, with respect to each lens region, and a selector to select any one of the first and second voltage sources so as to apply voltages to the first electrodes.

13 Claims, 10 Drawing Sheets

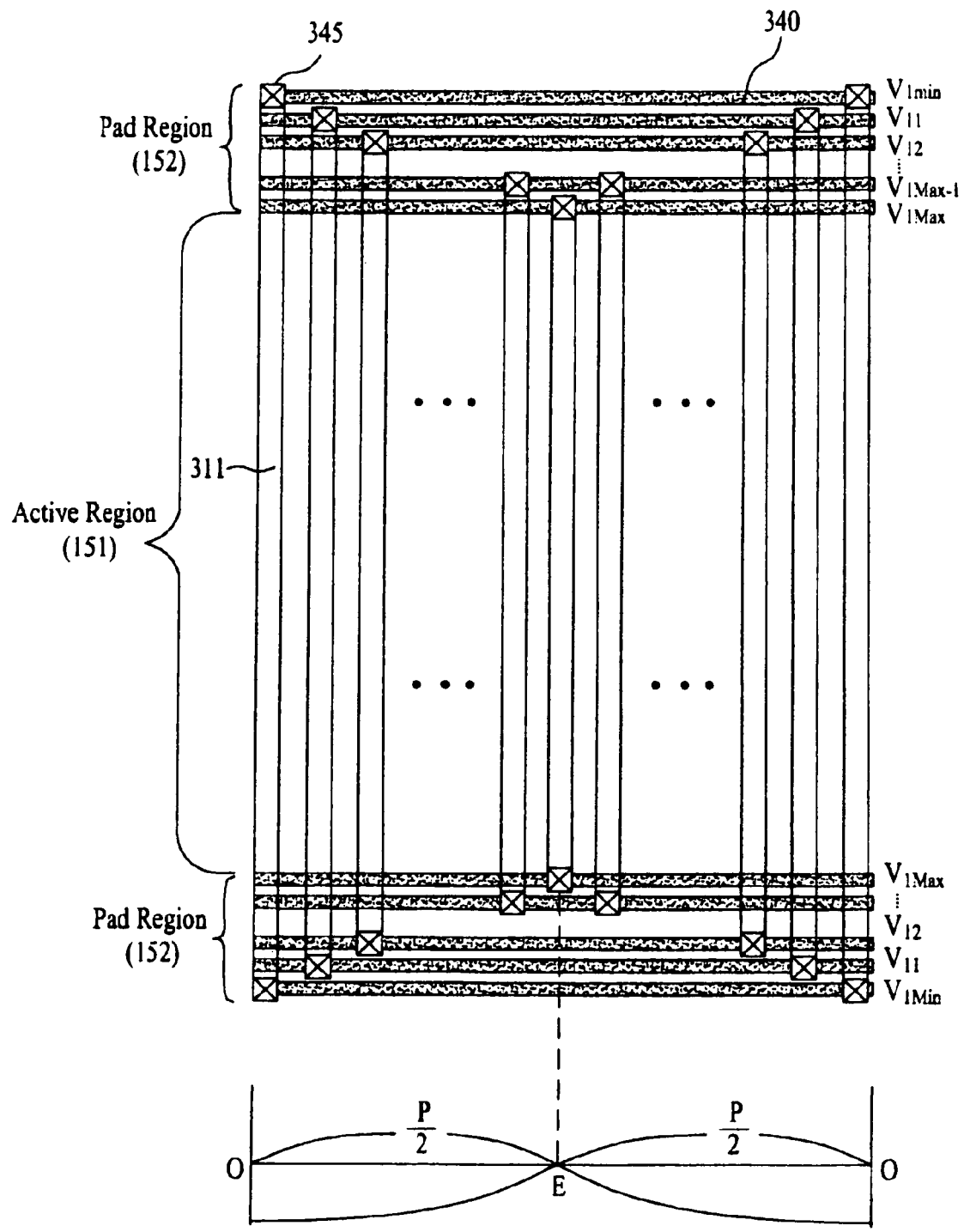

$$f_1 = \left[\tfrac{1}{a} + \tfrac{1}{z_1}\right]^{-1} > 0$$

$$f_2 = \left(\frac{1}{a} + \frac{1}{z_2}\right)^{-1} < 0$$

ELECTRICALLY-DRIVEN LIQUID CRYSTAL LENS AND STEREOSCOPIC DISPLAY DEVICE USING THE SAME

This application claims the benefit of the Korean Patent Application No. P2007-131155, filed on Dec. 14, 2007, which is hereby incorporated by reference as if fully set forth herein.

BACKGROUND OF THE INVENTION

1. Field of the Invention

The present invention relates to a stereoscopic display device, and more particularly, to an electrically-driven liquid crystal lens, which can be switched between a convex lens and a concave lens by changing an optical path difference based on an electric field application manner, and a stereoscopic display device using the same.

2. Discussion of the Related Art

At present, services for rapid dissemination of information, on high-speed information communication networks, have developed from a simple "listening and speaking" service, such as current telephones, to a "watching and listening" multimedia type service based on digital terminals used for high-speed processing of characters, voice and images, and are expected to be ultimately developed into cyberspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference therebetween. Such a difference between images due to the positional difference of the eyes is called binocular disparity. A 3-dimensional stereoscopic image display device is designed on the basis of binocular disparity, allowing the left eye to view only an image for the left eye and the right eye to view only an image for the right eye.

Specifically, the left and right eyes view different 2-dimensional images, respectively. If the two different images are transmitted to the brain through the retina, the brain accurately fuses the images, giving the impression of real 3-dimensional images. This ability is conventionally called stereography, and a stereoscopic display device is obtained by applying stereography to a display device.

Technologies for displaying the above-described 3-dimensional stereoscopic images may be classified into a stereoscopic display method using binocular disparity, and a volumetric measurement method using perception per volumetric unit. As an example of the volumetric measurement method, there is an Integral Photography (IP) display method wherein integrated images such as holograms are perceived. In the IP display method, a microlens array is used that does not require a user to wear glasses.

Such an IP display method using a microlens array, as a representative technology for realizing 3-dimensional images, was first proposed by Lippman in 1908, but has not attracted considerable attention due to a limit in technologies of display devices. Recently, in conjunction with developments in high-resolution display devices, an IP display method has been actively researched.

Hereinafter, a conventional stereoscopic display device will be described with reference to the drawing.

FIG. 1 is a schematic view illustrating a conventional IP type stereoscopic display device.

As shown in FIG. 1, a conventional IP type stereoscopic display device includes a display device 10 and a lens array 20 consisting of microlenses as unit lens.

Here, assuming that the microlenses of the lens array 20 have a focal distance f, if a distance a between the display device 10 and the lens array 20 is determined, a distance b between the lens array 20 and a position where an integrated image is formed can be calculated by the following Equation.

$$\frac{1}{a}+\frac{1}{b}=\frac{1}{f} \qquad \text{Equation 1}$$

In the stereoscopic display device, if the shape of the microlenses of the lens array 20 (i.e. the convexity of a lens plane) (here, the lens array 20 comprises a plurality of lens 21) is determined, the focal distance f is determined based on the plane shape of the microlenses. Since the distance a between the lens array 20 and the display device 10 within the stereoscopic display device is set to a predetermined value, the distance b between the lens array 20 and the integrated image can be determined by the focal distance f and the distance a between the lens array 20 and the display device 10.

However, the above-described conventional IP type stereoscopic display device has the following problems.

When forming a lens array having a curved lens plane, uniform control on a per region basis of the curved lens and attachment/alignment between the lens array and a display device therebelow are difficult, resulting in deterioration in visual sensitivity.

Therefore, as part of the effort to change the shape of the lens array, there has been introduced an electrically-driven liquid crystal lens based on a difference in the refractive indexes of liquid crystals under the influence of an electric field. The electrically-driven liquid crystal lens does not require processing of a lens plane and can be realized via a simplified electrode arrangement and voltage application, thereby preventing problems due to lens processing.

SUMMARY OF THE INVENTION

Accordingly, the present invention is directed to an electrically-driven liquid crystal lens and a stereoscopic display device using the same that substantially obviate one or more problems due to limitations and disadvantages of the related art.

An advantage of the present invention is to provide an electrically-driven liquid crystal lens, which can be switched between a convex lens and a concave lens by changing an optical path difference based on an electric field application manner, and a stereoscopic display device using the same.

Additional advantages, and features of the invention will be set forth in the description which follows and in part will become apparent from the descriptions or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, an electrically-driven liquid crystal lens comprises: first and second substrates arranged opposite each other and each defining a plurality of lens regions to correspond with each other; a plurality of first electrodes formed on the first substrate based on the lens region and spaced apart from one another; a second electrode formed over the entire surface of the second substrate; a liquid crystal layer filled between the first substrate and the second substrate; first and second voltage sources to apply different voltages to the plurality of first electrodes in each lens region, the first and second voltage sources providing the liquid crystal layer between the first and second substrates with a convex lens optical path difference and a concave lens optical path difference, respectively, with respect to each lens region; and a selector to select any one of the first and second voltage sources so as to apply voltages to the first electrodes.

In another aspect of the present invention, there is provided a stereoscopic display device comprising: a display panel configured to emit 2-dimensional image signals; an electrically-driven liquid crystal lens disposed on the display panel and including first and second substrates arranged opposite each other and each defining a plurality of lens regions corresponding with each other, a plurality of first electrodes formed on the first substrate based on the lens region and spaced apart from one another, a second electrode formed over the entire surface of the second substrate, and a liquid crystal layer filled between the first substrate and the second substrate; first and second voltage sources to apply different voltages to the plurality of first electrodes in each lens region, the first and second voltage sources providing the liquid crystal layer between the first and second substrates with a convex lens optical path difference and a concave lens optical path difference, respectively, with respect to each lens region; a selector to select any one of the first and second voltage sources so as to apply voltages to the first electrodes; and a controller to control the selector that selects any one of the first and second voltage sources.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 5A is a plan view illustrating first electrodes and metal lines in a lens region of a first substrate, which are connected with a voltage generator of FIG. 4 for realization of a convex lens;

DETAILED DESCRIPTION OF THE ILLUSTRATED EMBODIMENTS

Reference will now be made in detail to an embodiment of the present invention, an example of which is illustrated in the accompanying drawings. Wherever possible, the same reference numbers will be used throughout the drawings to refer to the same or like parts.

Recently, an electrically-driven liquid crystal lens wherein a liquid crystal lens serves as a lens based on characteristics of liquid crystal molecules has been proposed.

Specifically, a lens is designed to control the path of incident light on a per position basis using a difference between an index of refraction of a lens constituent material and an index of refraction of air. In the electrically-driven liquid crystal lens, if different voltages are applied to the liquid crystal layer according to the position of an electrode so as to drive the liquid crystal layer by different electric fields, light introduced into the liquid crystal layer causes different phase variations based on the position and as a result, the liquid crystal layer can control the path of incident light in the same manner as an actual lens.

Hereinafter, an electrically-driven liquid crystal lens and a stereoscopic display device using the same will be described in detail.

Figure 1:
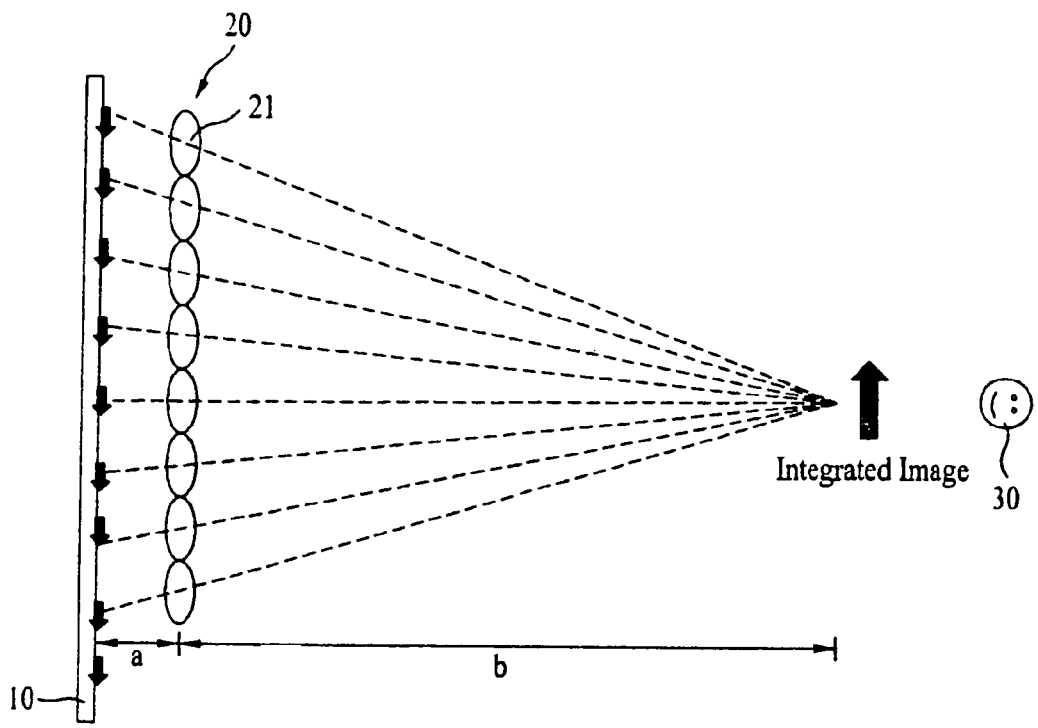
FIG. 1 is a schematic view illustrating a conventional IP type stereoscopic display device.
Figure 2:
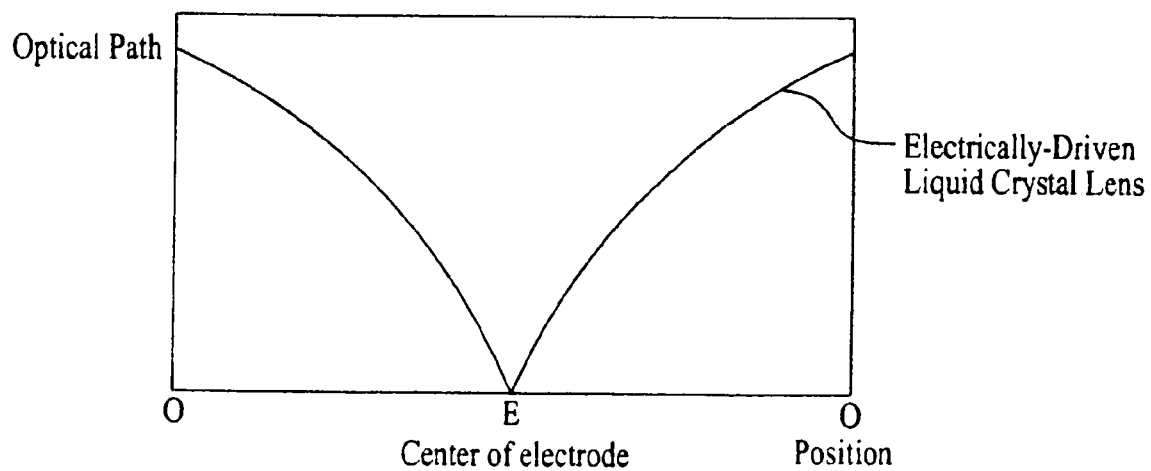
FIG. 2 is a sectional view illustrating an electrically-driven liquid crystal lens according to the present invention.
Figure 3:
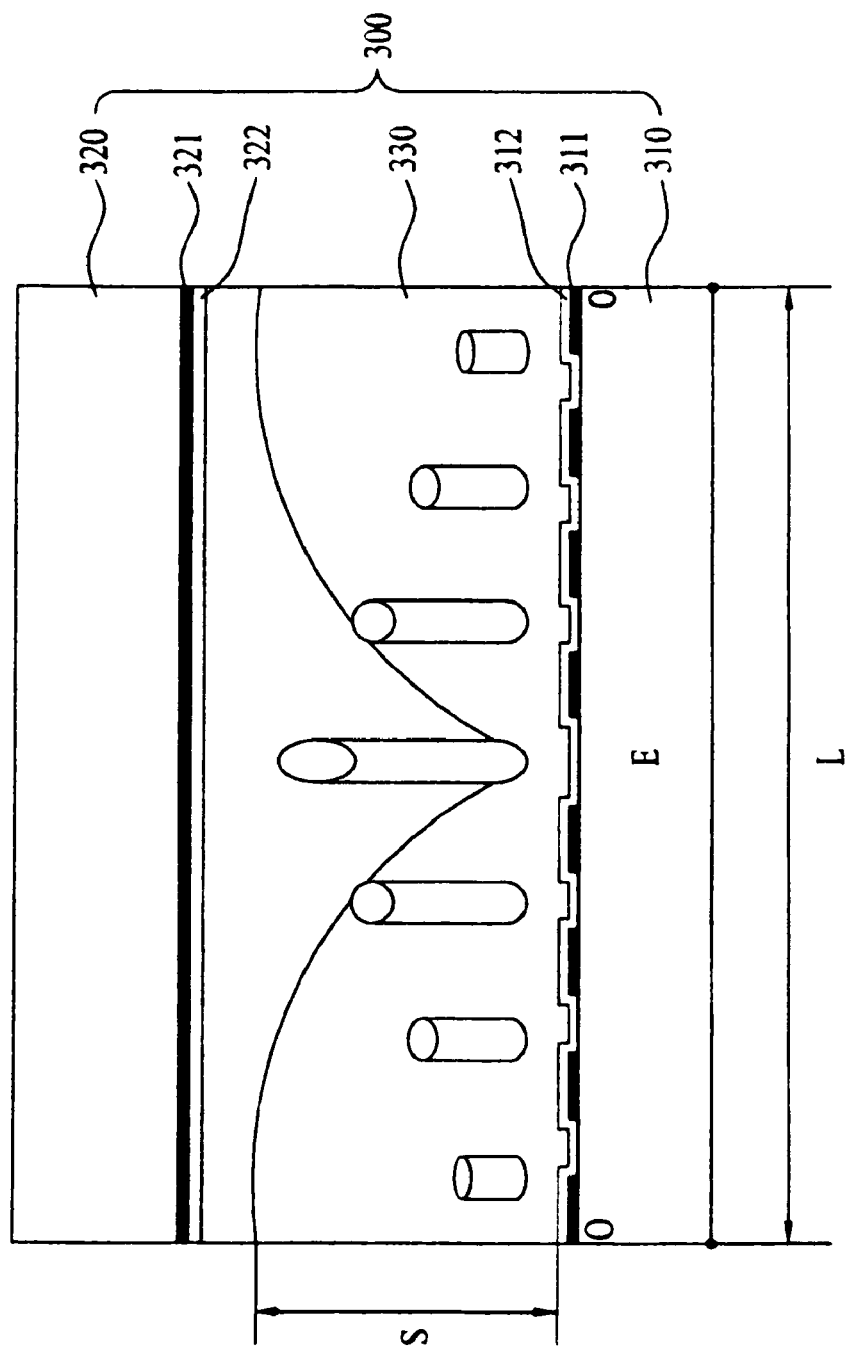
FIG. 3 is a graph illustrating an optical path difference per distance of the electrically-driven liquid crystal lens shown in FIG. 2.

FIG. 2 is a sectional view illustrating an electrically-driven liquid crystal lens according to the present invention, and FIG. 3 is a graph illustrating an optical path difference per distance of the electrically-driven liquid crystal lens shown in FIG. 2.

As shown in FIGS. 2 and 3, the electrically-driven liquid crystal lens 300 according to the present invention includes first and second substrates 310 and 320 arranged opposite each other and each defining a plurality of lens regions to correspond to those of the other substrate, a plurality of first electrodes 311 spaced apart from one another on the first substrate 310 in each lens region L, a second electrode 321 formed over the entire surface of the second substrate 320, voltage sources to apply different voltages to the respective first electrodes 311, and a liquid crystal layer 330 filled between the first substrate 310 and the second substrate 320.

Here, the first and second electrodes 311 and 321 are made of transparent metals, such as Indium Tin Oxide (ITO) and Indium Zinc Oxide (IZO) and prevent loss of transmissivity at locations thereof.

More specifically, the plurality of first electrodes 311 are equidistantly arranged on the first substrate 310 in each lens region L. In the electrically-driven liquid crystal lens based on driving of the liquid crystal layer 330, as shown in FIGS. 2 and 3, the lens region L has an optical path difference of a single lens, and a plurality of lens regions L each having such an optical path difference are periodically repeated in the electrically-driven liquid crystal lens 300. Referring to FIG. 2, the lens region L is repeated in a horizontal direction and the first electrodes 311 have a bar shape elongated in a given direction (i.e. in a direction into the drawing).

For convenience of description, with respect to a convex lens, an edge E of the lens region L corresponds to the lowest portion of the convex lens and a center O of the lens region L corresponds to the highest portion of the convex lens. On the contrary, with respect to a concave lens, the edge E corresponds to the highest portion of the concave lens and the center O corresponds to the lowest portion of the lens.

The first electrodes 311 may be equidistantly arranged as shown, or may be spaced apart from one another with gradually increasing or decreasing distance from the edge E to the center O. As compared to the equidistant arrangement, differentiating distances between the first electrodes 311 requires more precise regulation of levels of voltages applied to the respective first electrodes 311. For this, in the present invention, a voltage level regulator (not shown) may be further provided at the electrically-driven liquid crystal lens 300. Similarly, the width of the first electrodes 311 may be gradually increased or decreased from the edge E to the center O.

Liquid crystal molecules of the liquid crystal layer 330 have characteristics of responding to the strength and distribution of an electric field applied to the first and second electrodes 311 and 321 and thus, have a phase distribution similar to that of the electrically-driven liquid crystal lens shown in FIG. 3.

A first alignment film 312 and a second alignment film 322 are formed, respectively, on the first substrate 310 including the first electrodes 311 and on the second electrode 321. In this case, to allow the electrically-driven liquid crystal lens 300 to function as a transparent layer in an initial state when no voltage is applied thereto, the first alignment film 312 has the same rubbing direction as a longitudinal direction of the first electrodes 301, and the second alignment film 322 has an anti-parallel rubbing direction with respect to that of the first alignment film 312.

Here, voltages applied to the first and second electrodes 311 and 321 alter behavior of liquid crystal molecules of the electrically-driven liquid crystal lens, causing an index of refraction in the form of a spatial parabolic function.

Here, the lowest minimum voltage, i.e. a threshold voltage is applied to the first electrode 311 corresponding to the center O of the lens region L. The threshold voltage is an AC square wave voltage having a peak value of about 1.4~2V. The threshold voltage is given by $$V = \pi \sqrt{\frac{K1}{\Delta \varepsilon \varepsilon 0}}$$

(where, $\Delta \in$ is the dielectric constant anisotropy of liquid crystals, K1 is the modulus of elasticity of liquid crystals, and $\in_0$ is a free-space dielectric constant). In addition, the highest voltage is applied to the first electrode 101 corresponding to the edge E of the lens region L. The highest voltage is an AC square wave voltage having a peak value of about 2.5~10V.

Figure 6:
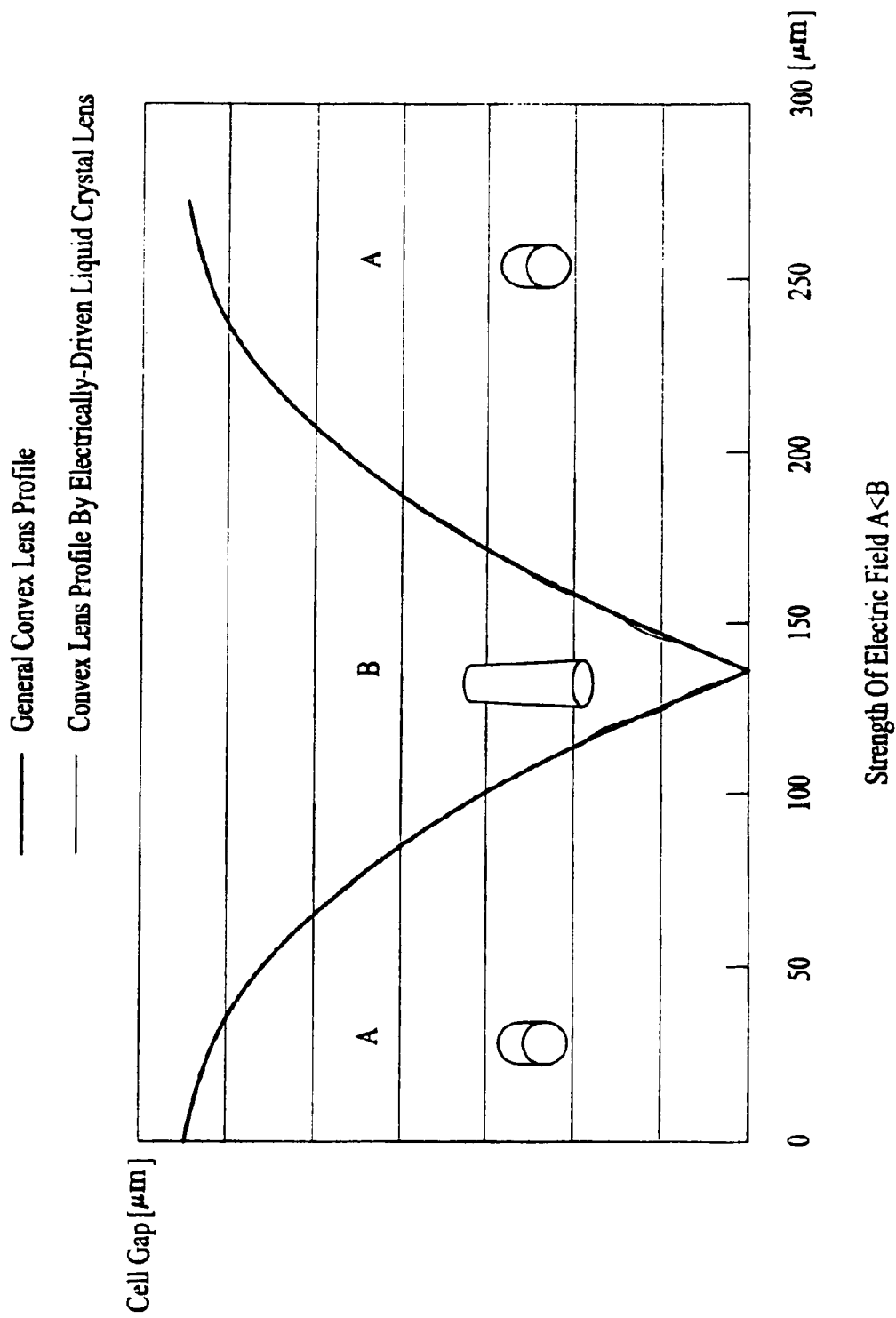
FIG. 6 is a graph illustrating an optical path difference per distance for realization of a convex lens profile in the electrically-driven liquid crystal lens according to the present invention.
Figure 7:
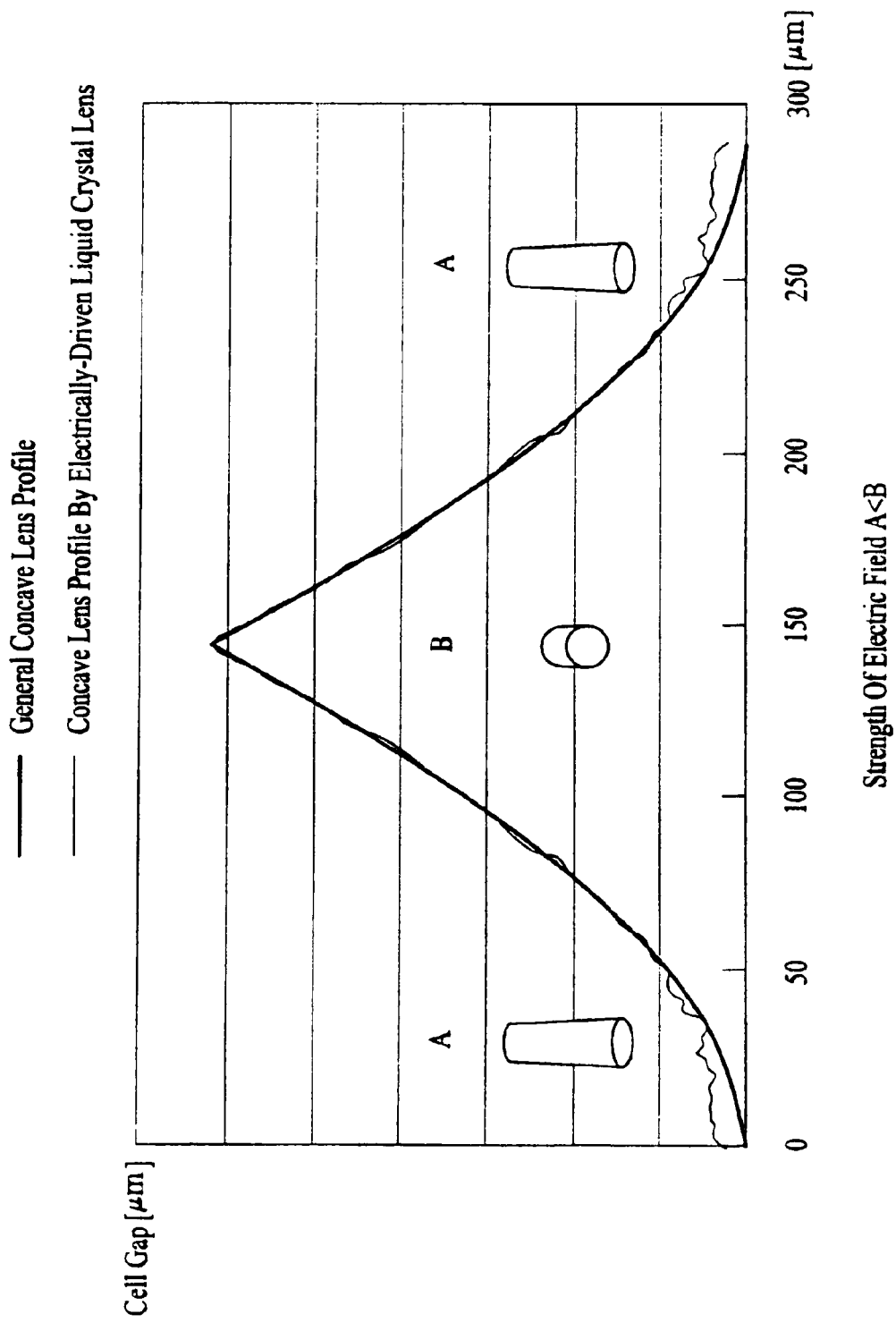
FIG. 7 is a graph illustrating an optical path difference per distance for realization of a concave lens profile in the electrically-driven liquid crystal lens according to the present invention.
Figure 8:
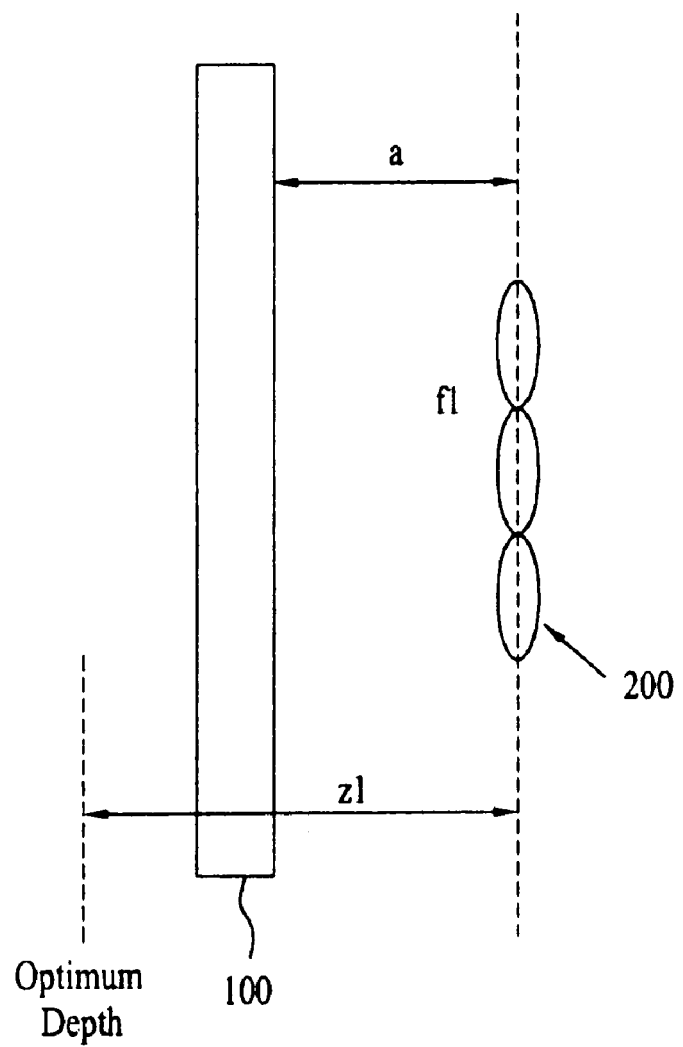
FIG. 8 is a view illustrating an optimum depth for realization of a convex lens profile in the electrically-driven liquid crystal lens according to the present invention.
Figure 9:
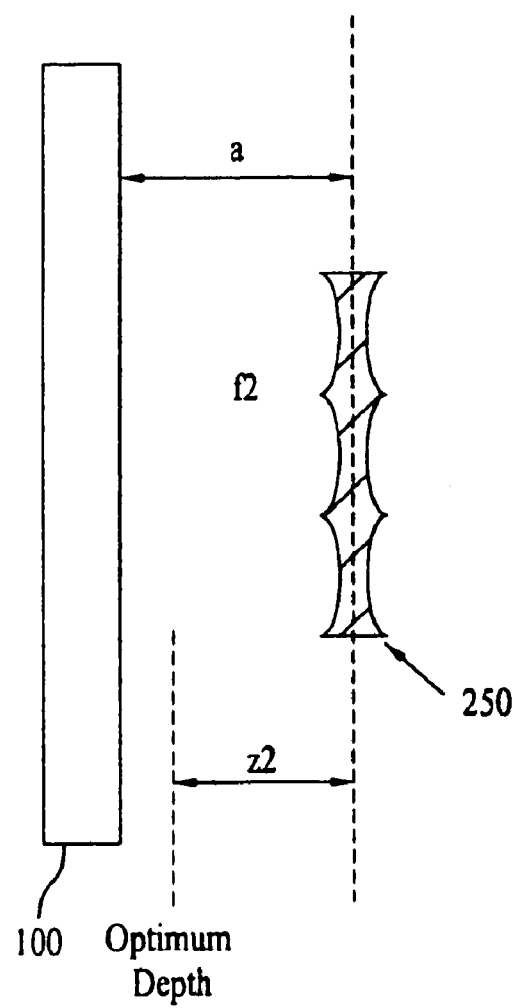
FIG. 9 is a view illustrating an optimum depth for realization of a concave lens profile in the electrically-driven liquid crystal lens according to the present invention.

Although FIGS. 2 and 3 illustrate the electrically-driven liquid crystal lens 300 as having the same phase effects as a convex lens, the electrically-driven liquid crystal lens 300 of the present invention may selectively have a phase distribution of a convex lens (See FIGS. 6 and 8) or a phase distribution of a concave lens (See FIGS. 7 and 9).

To provide the electrically-driven liquid crystal lens 300 with the same phase effect as a convex lens, the highest voltage is applied to the first electrode 311 located at the edge E of the lens region L and voltages applied to the other first electrodes 311 are gradually decreased toward the center O in sequence and a ground voltage is applied to the second electrode 321. With this voltage application, a vertical electric field is strongest at the edge E of the lens region L, and the strength of the vertical electric field decreases away from the edge E. Thereby, assuming that the liquid crystal molecules of the liquid crystal layer 30 have positive dielectric constant anisotropy, the liquid crystal molecules are arranged according to the electric field in such a way that the liquid crystal molecules are upright at the edge E of the lens region L and tilt closer to a horizontal plane at the center O of the lens region L. As a result, in view of light transmission, an optical path is shortest at the edge E of the lens region L and is gradually increased with increasing distance from the edge E to the center O of the lens region L. Representing the length variation of the optical path using a phase plane, it can be appreciated that the electrically-driven liquid crystal lens has light transmission effects similar to a convex lens.

On the other hand, to provide the electrically-driven liquid crystal lens 300 with the same phase effect as a concave lens, the highest voltage is applied to the first electrode 311 located at the center O of the lens region L and voltages applied to the other first electrodes 311 are gradually decreased toward the edge E in sequence and a ground voltage is applied to the second electrode 321. With this voltage application, a vertical electric field is strongest at the center O of the lens region L, and the strength of the vertical electric field decreases away from the center O. Thereby, assuming that the liquid crystal molecules of the liquid crystal layer 30 have positive dielectric constant anisotropy, the liquid crystal molecules are arranged according to the electric field in such a way that the liquid crystal molecules are upright at the center O of the lens region L and tilt closer to a horizontal plane at the edge E of the lens region L. As a result, in view of light transmission, an optical path is shortest at the center O of the lens region L and is gradually increased with increasing distance from the center O to the edge E of the lens region L. Representing the length variation of the optical path using a phase plane, it can be appreciated that the electrically-driven liquid crystal lens has light transmission effects similar to a concave lens.

With relation to realization of the electrically-driven liquid crystal lens 300 as a convex lens or concave lens as described above, it should be noted that the convex lens and concave lens do not simply require inverse voltage application wherein voltages applied to the respective first electrodes 311 gradually increase or decrease from the edge E to the center O of the lens region L. Specifically, a convex lens and concave lens realized by the electrically-driven liquid crystal lens 300 have different curvatures based on optical path difference, and therefore, voltages to be applied to the first electrodes 311 must be gradually increased or decreased from the edge E to the center O at rates regulated differently.

More specifically, to drive the electrically-driven liquid crystal lens 300 as a convex lens, the convex lens has a steep curvature in the vicinity of the edge E and a gentle curvature in the vicinity of the center O. Accordingly, in addition to applying the highest voltage to the first electrode located at the edge E and the lowest voltage to the first electrode located at the center O, voltages to be applied to the respective first electrodes 311 must be gradually decreased at different rates from the edge E to the center O in view of the different curvatures of the convex lens.

Also, to drive the electrically-driven liquid crystal lens 300 as a concave lens, the concave lens has a steep curvature in the vicinity of the edge E and a gentle curvature in the vicinity of the center O. Accordingly, in addition to applying the highest voltage to the first electrode located at the center O and the lowest voltage to the first electrode located at the edge E, voltages to be applied to the respective first electrodes 311 must be gradually increased at different rates from the edge E to the center O in view of the different curvatures of the convex lens.

In FIG. 3, reference letter "S" indicates lens sag. When an optical path difference occurs on a per lens region basis as liquid crystal molecules of the liquid crystal layer 300 are driven by an electric field created when voltages are applied to the first and second electrodes 311 and 321, the lens sag S is a region exhibiting the largest optical path difference. The lens sag S is adjustable by adjusting the highest voltage to be applied to the first electrodes 311 and may have a partial effect on the curvature of a resulting convex lens or concave lens.

Hereinafter, a drive unit to enable switching between the convex lens and concave lens as described above will be introduced.

Figure 4:
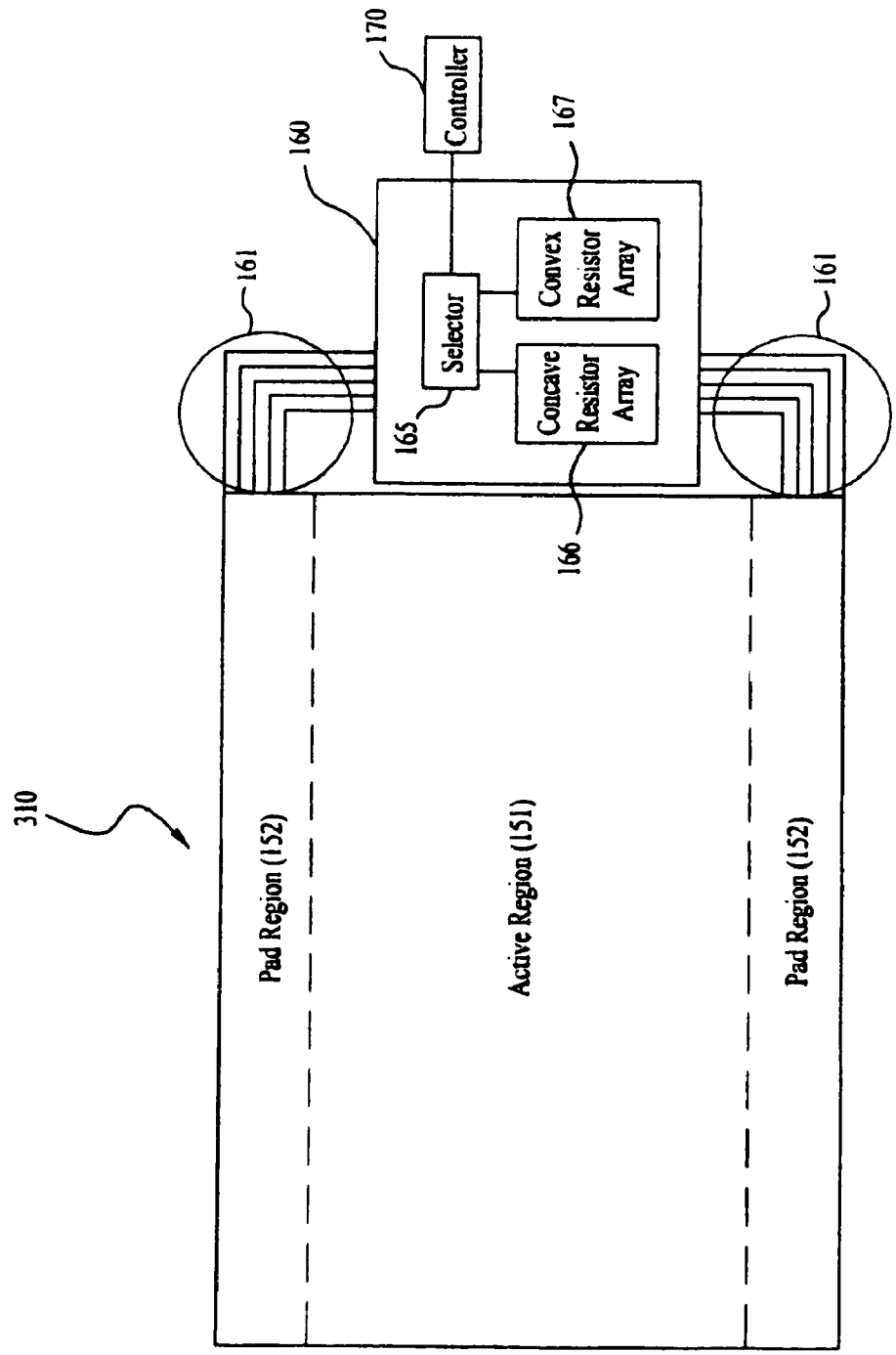
FIG. 4 is a block diagram of the electrically-driven liquid crystal lens according to the present invention.
Figure 5B:
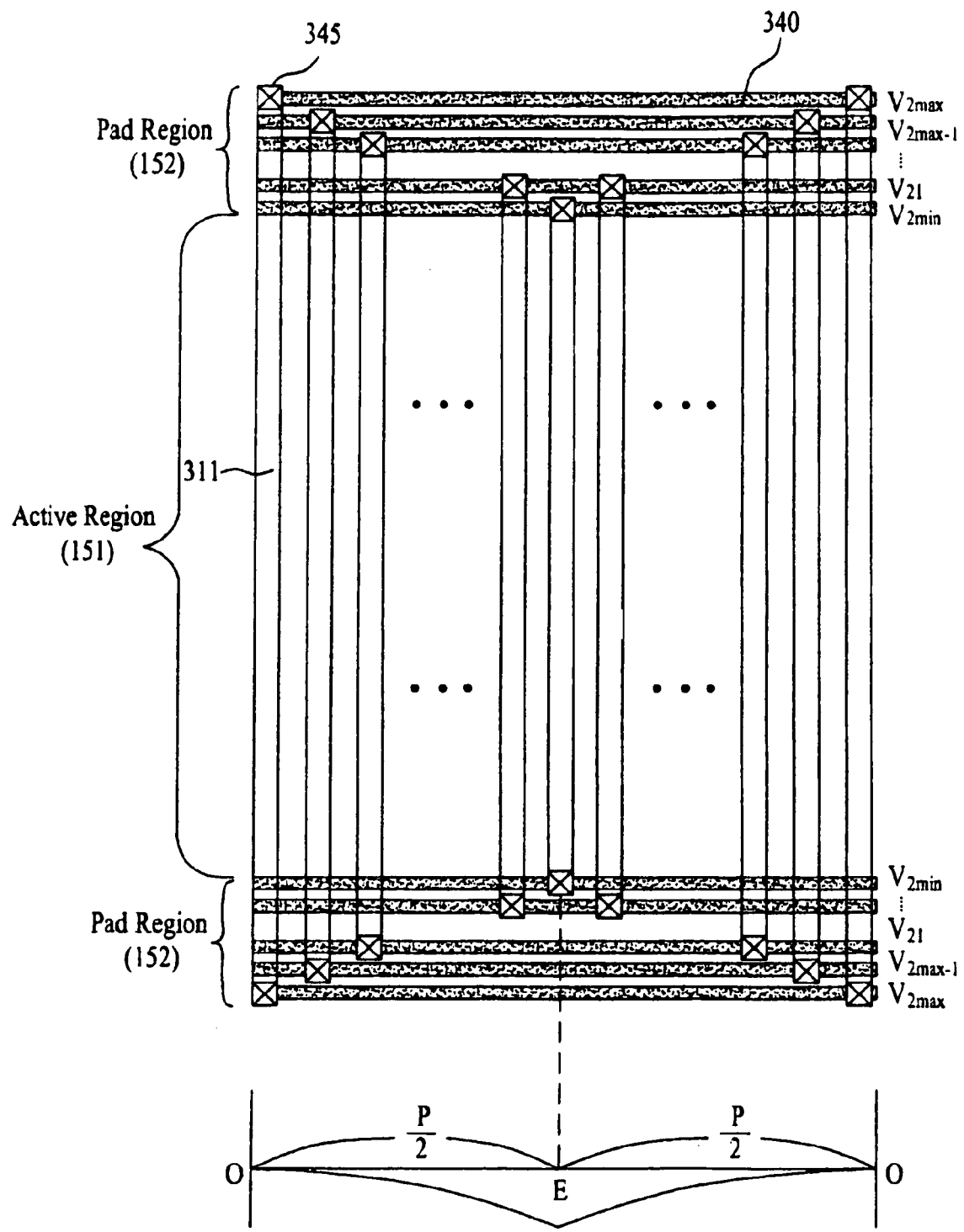
FIG. 5B is a plan view illustrating first electrodes and metal lines in a lens region of a first substrate, which are connected with a voltage generator of FIG. 4 for realization of a concave lens.

FIG. 4 is a block diagram of the electrically-driven liquid crystal lens according to the present invention. FIG. 5A is a plan view illustrating first electrodes and metal lines in a lens region of the first substrate 310, which are connected with a voltage generator of FIG. 4 for realization of a convex lens, and FIG. 5B is a plan view illustrating first electrodes and metal lines in a lens region of the first substrate 310, which are connected with a voltage generator of FIG. 4 for realization of a concave lens.

As shown in FIG. 4, the electrically-driven liquid crystal lens 300 of the present invention includes an active region 151 as a center display region, and pad regions 152 at upper and lower ends of the active region 151. Although the pad regions 152 are illustrated only at the upper and lower ends of the active region 151, the pad regions 152 may be provided at left and right ends of the active region 151. In the latter case, the first electrodes 311, which come into contact with metal lines (See reference numeral 340 in FIGS. 5A and 5B), are perpendicularly bent at left and right ends thereof and are connected at the bent locations with an exterior distributed-voltage generator 160 and Flexible Printed Circuit (not shown) via connectors.

Voltage signals to be applied to the respective first electrodes (311 in FIG. 2) provided at the first substrate 310 are generated by and transmitted from the distributed-voltage generator 160 provided at outside of the first substrate 310. The distributed-voltage generator 160 includes a concave resistor array 166 to generate distributed voltages for driving of the electrically-driven liquid crystal lens as a concave lens, a convex resistor array 167 to generate distributed voltages for driving of the electrically-driven liquid crystal lens as a convex lens, and a selector 165 to select driving of the concave resistor array 166 or convex resistor array 167.

Here, the selector 165 can select driving of the concave resistor array 166 or convex resistor array 167 under the control of an exterior controller 170. If any one of the concave resistor array 166 and convex resistor array 167 is selected, n voltage signals output from the selected array are transmitted to the metal lines (340, See FIGS. 5A and 5B) formed at the pad regions 152 via links 161. In this case, the number of output terminals of the concave resistor array 166 is equal to the number of output terminals of the convex resistor array 167 and the total number of the output terminals is equal to the number of the metal lines 340 connected thereto. The controller 170 to enable selection of the particular array can be manually or automatically operated. The automatic operation of the controller 170 may be based on information including the depth of an image to be displayed or a distance between a viewer and the electrically-driven liquid crystal lens.

With respect to each lens region L, as shown in FIGS. 5A and 5B, the metal lines 340, to which voltage signals are applied from the distributed-voltage generator 160 via the links 161, have electrical contacts 345 with the first electrodes 311 intersecting with the metal lines 340 at symmetrical positions on the basis of the center O. Thereby, a total of n voltage signals from the minimum voltage to the maximum voltage are applied from the metal lines 340 to the first electrodes 311 via the contacts 345. As shown in the drawings, the contacts 345 between the metal lines 340 and the first electrodes 311 are symmetrically arranged on the basis of the center O. In this case, assuming that a total of n metal lines 340 are provided in each pad region, a total of 2n−1 first electrodes 311 are provided in each lens region to come into contact with the metal lines 340. As shown, each first electrode 311 may intersect, at both ends thereof, with the metal lines 340, or as occasion demands, may intersect, only at one end thereof, with the metal line 340.

Different voltages are applied to the metal lines 340 depending upon whether the electrically-driven liquid crystal lens 300 is realized as a convex lens or concave lens.

FIG. 5A illustrates voltage application to realize the electrically-driven liquid crystal lens 300 as a convex lens. In the drawing, a total of n voltage values $V_{1min}$, $V_{11}$, $V_{12}$, ..., $V_{1max-1}$ and $V_{max}$ are sequentially applied to the metal lines 340 from the center O at the left side of the drawing to the edge E and again, symmetrical voltage values from the maximum voltage $V_{1max}$ to the minimum voltage $V_{1min}$ are sequentially applied from the edge E to the center O at the right side of the drawing.

FIG. 5B illustrates voltage application to realize the electrically-driven liquid crystal lens 300 as a concave lens. In the drawing, a total of n voltage values $V_{2max}$, $V_{2max-1}$, $V_{21}$, ... and $V_{2min}$ are sequentially applied to the metal lines 340 from the center O at the left side of the drawing to the edge E and again, symmetrical voltage values from the minimum voltage $V_{2min}$ to the maximum voltage $V_{2max}$ are sequentially applied from the edge E to the center O at the right side of the drawing.

FIG. 6 is a graph illustrating an optical path difference per distance for realization of a convex lens profile in the electrically-driven liquid crystal lens according to the present invention, and FIG. 7 is a graph illustrating an optical path difference per distance for realization of a concave lens profile in the electrically-driven liquid crystal lens according to the present invention.

Referring to FIG. 6 illustrating the electrically-driven liquid crystal lens as a convex lens, a vertical electric field is stronger at the edge B of the lens region than the center A, whereby the electrically-driven liquid crystal lens has a convex profile at the center A. In this case, liquid crystal molecules substantially tilt at the center A due to a weak vertical electric field, and are upright at the edge B due to a strong vertical electric field.

The drawing illustrates an optical path difference represented as a difference of available refractive indexes of liquid crystals per position when the strength of an electric field is stronger at the edge B than the center A. In this case, the lens sag at the center A is about 20 μm.

Referring to FIG. 7 illustrating the electrically-driven liquid crystal lens as a concave lens, a vertical electric field is stronger at the center A of the lens region rather than the edge B, whereby the electrically-driven liquid crystal lens has a concave lens profile at the center A. In this case, liquid crystal molecules are upright at the center A by a strong vertical electric field, and substantially tilt at the edge B by a weak vertical electric field.

The drawing illustrates an optical path difference represented as a difference of an available refractive index of liquid crystals per position when the strength of an electric field is stronger at the center A than the edge B. In this case, the lens sag at the edge B is about 20 μm.

The lens sag in FIGS. 6 and 7 is a simulated value, and may be changed to be greater or smaller than 20 μm adjusting the strength of an electric field.

FIG. 8 is a view illustrating an optimum depth for realization of a convex lens profile in the electrically-driven liquid crystal lens according to the present invention, and FIG. 9 is a view illustrating an optimum depth for realization of a concave lens profile in the electrically-driven liquid crystal lens according to the present invention.

Referring to FIGS. 8 and 9, a stereoscopic display device using the electrically-driven liquid crystal lens of the present invention includes a display panel 100, and an electrically-driven liquid crystal lens 200 or 250 spaced apart from the display panel 100 by a first interval a. In addition, a light source may be provided below the display panel 100 at an opposite side of the electrically-driven liquid crystal lens 200 or 250. Alternatively, if the display panel 100 has a self-illumination function, the light source may be omitted.

The electrically-driven liquid crystal lens may be realized as a convex lens as shown in FIG. 8, or may be realized as a concave lens as shown in FIG. 9. That is, the electrically-driven liquid crystal lens can be switched between a convex lens and a concave lens.

The switching between the convex lens and the concave lens is based on the regulation of a focal distance f1 or f2. If the focal distance has a positive value, a convex lens array 200 can be realized, and if the focal distance has a negative value, a concave lens array 250 can be realized.

Specifically, when an optimum depth of an image, which is emitted from the display panel 100 to thereby be displayed on the stereoscopic display device via the electrically-driven liquid crystal lens, is longer than the interval between the display panel and the electrically-driven liquid crystal lens as shown in FIG. 8, the focal distance f1 is given by $$f1 = \left(\frac{1}{a} + \frac{1}{z1}\right)^{-1} > 0.$$

The focal distance f1 is greater than zero and thus, the electrically-driven liquid crystal lens is driven as a convex lens. On the other hand, when the optimum depth of an image is shorter than the interval between the display panel and the electrically-driven liquid crystal lens as shown in FIG. 9, the focal distance f2 is given by $$f2 = \left(\frac{1}{a} + \frac{1}{z2}\right)^{-1} < 0.$$

The focal distance f2 is less than zero and thus, the electrically-driven liquid crystal lens is driven as a concave lens.

Here, the interval between the display panel 100 and the electrically-driven liquid crystal lens 200 or 250 is defined as the first interval a, and the electrically-driven liquid crystal lens can be switched between the convex lens and the concave lens or, without switching, can change the optimum depth or focal distance.

Hereinafter, a concrete configuration of the stereoscopic display device according to the present invention will be described.

Figure 10:
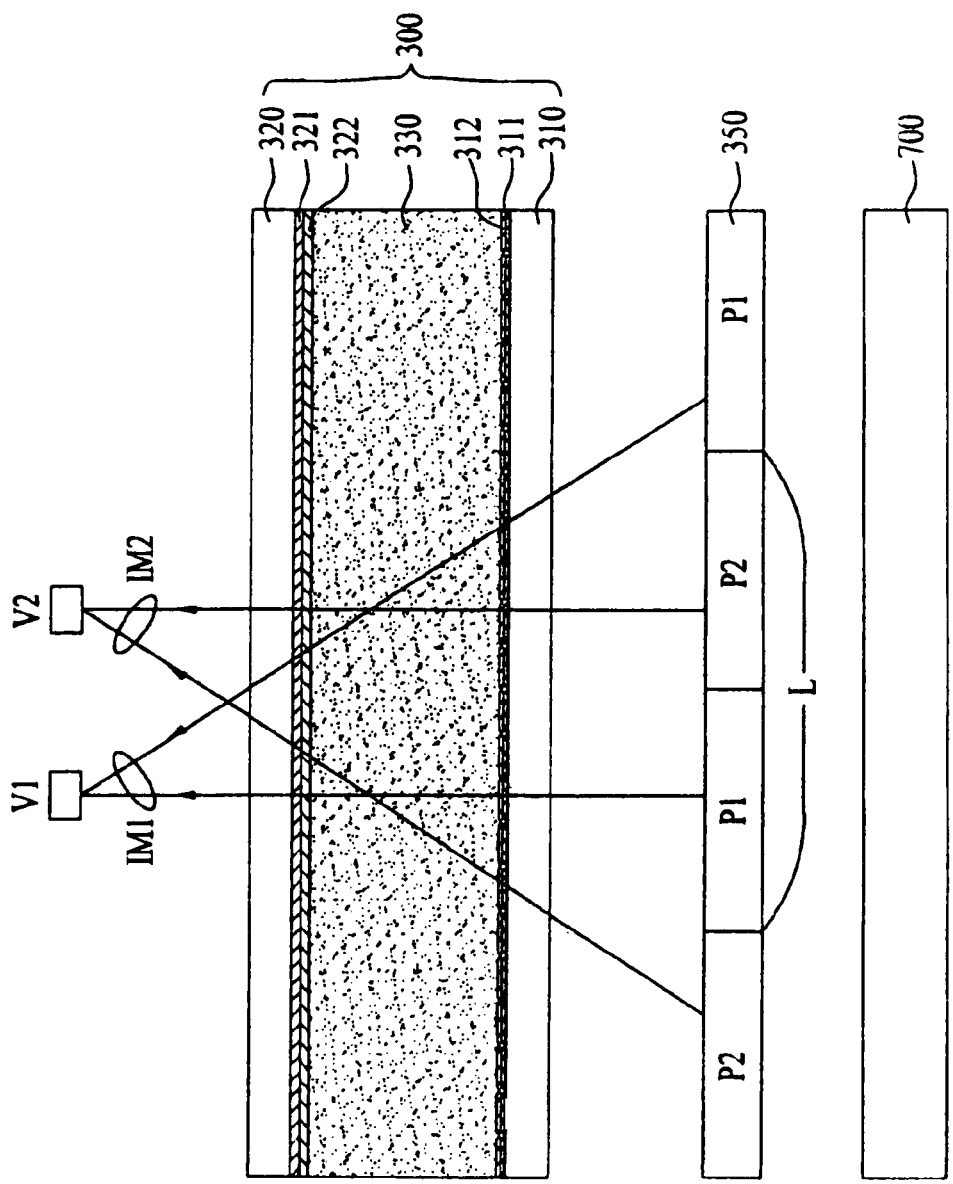
FIG. 10 is a sectional view illustrating a stereoscopic display device using the electrically-driven liquid crystal lens according to the present invention.

FIG. 10 is a sectional view illustrating the stereoscopic display device including the electrically-driven liquid crystal lens according to the present invention.

The stereoscopic display device of the present invention includes an electrically-driven liquid crystal lens 300, which is driven upon receiving voltages to thereby function as a lens, a display panel 350, which is disposed below the electrically-driven liquid crystal lens 300 and serves to emit 2-dimensional image information, and a light source 700, which is disposed below the display panel 350 and serves to direct light to the display panel 350.

As occasion demands, if the display panel 350 is a self-illumination device, such as an organic light emitting display device, omission of the light source 700 is possible.

The display panel 350 contains first and second image pixels P1 and P2 alternately and repeatedly arranged to display first and second images IM1 and IM2, respectively. The display panel 350 can be selected from various flat-panel displays including a Liquid Crystal Display (LCD), Organic Light Emitting Display (OLED), Plasma Display Panel (PDP), Field Emission Display (FED), etc. The display panel 350 is located below the electrically-driven liquid crystal lens 300, and serves to transmit 2-dimensional image signals to the electrically-driven liquid crystal lens 300.

The electrically-driven liquid crystal lens 300 according to the present invention functions to emit 3-dimensional image signals from 2-dimensional image signals according to a lens profile, and is located above the display panel 350 that forms 2-dimensional images. The electrically-driven liquid crystal lens 300 may emit 3-dimensional image signals, or may directly emit 2-dimensional image signals according to whether or not voltages are applied thereto. Specifically, the electrically-driven liquid crystal lens 300 is designed to directly transmit light when no voltage is applied thereto and thus, can serve as a switching device to display 2-dimensional images when no voltage is applied thereto and display 3-dimensional images when voltages are applied thereto.

Here, on the basis of the configuration of the electrically-driven liquid crystal lens 300 shown in FIG. 2, as occasion demands, the plurality of first electrodes 311 arranged in each lens region L may be divided into a plurality of layers. For example, the first electrodes 311 may be divided and arranged on the first substrate 310 and on a first insulating film (not shown) above the first substrate 310. In this case, the first electrodes located on the first substrate 310 are alternately located with the first electrodes on the first insulating film, to substantially fill the first substrate 310.

Dividing the first electrodes 311 into two or more layers can prevent a short-circuit between electrodes and provide the electrically-driven liquid crystal lens with a more stable profile.

As apparent from the above description, an electrically-driven liquid crystal lens and a stereoscopic display device using the same have the following effects.

The electrically-driven liquid crystal lens can be switched between a convex lens profile and a concave lens profile according to information including the depth of an image or a distance between the electrically-driven liquid crystal lens and a viewer, resulting in an improvement in visual sensitivity. The electrically-driven liquid crystal lens can effectively deal with different depths of images as necessary, achieving an increased displayable depth range.

According to the present invention, visual sensitivity can be further improved with the provision of a voltage level regulator to control lens sag upon realization of the electrically-driven liquid crystal lens as a convex lens or concave lens.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An electrically-driven liquid crystal lens comprising:
    first and second substrates arranged opposite each other and each defining a plurality of lens regions to correspond with each other;
    a plurality of first electrodes formed in one direction on the first substrate based on the lens region and spaced apart from one another;
    a second electrode formed over the entire surface of the second substrate;
    a liquid crystal layer filled between the first substrate and the second substrate;
    first and second voltage sources to apply different voltages to the plurality of first electrodes in each lens region, the first and second voltage sources providing the liquid crystal layer between the first and second substrates with a convex lens optical path difference and a concave lens optical path difference, respectively, with respect to each lens region;
    a selector to select any one of the first and second voltage sources so as to apply voltages to the first electrodes;
    a controller to control the selector which selects any one of the first and second voltage source; and
    metal lines provided at an edge region of the first substrate, to come into contact with the respective first electrodes per a lens region,
    wherein the metal lines are connected with the selector.

2. The lens according to claim 1, wherein the controller is manually controlled.

3. The lens according to claim 1, wherein the controller controls the selector to select the first voltage source or second voltage source according to 3-dimensional depth information of an image to be displayed.

4. The lens according to claim 1, wherein the controller controls the selector to select the first voltage source or second voltage source according to distance information between the electrically-driven liquid crystal lens and a viewer.

5. The lens according to claim 1, wherein the plurality of first electrodes is divided and arranged in a plurality of layers at different positions.

6. The lens according to claim 1, wherein the first and second voltage sources have resistor arrays, respectively, and apply first and second voltages having a voltage difference therebetween to the respective resistor arrays so as to output distributed voltages corresponding to the number of the metal lines.

7. The lens according to claim 6, further comprising:
    a voltage level regulator to regulate the level of a larger one of the first and second voltages.

8. A stereoscopic display device comprising:
    a display panel configured to emit 2-dimensional image signals;
    an electrically-driven liquid crystal lens disposed on the display panel and including first and second substrates arranged opposite each other and each defining a plurality of lens regions corresponding with each other, a plurality of first electrodes formed in one direction on the first substrate based on the lens region and spaced apart from one another, a second electrode formed over the entire surface of the second substrate, and a liquid crystal layer filled between the first substrate and the second substrate;
    first and second voltage sources to apply different voltages to the plurality of first electrodes in each lens region, the first and second voltage sources providing the liquid crystal layer between the first and second substrates with a convex lens optical path difference and a concave lens optical path difference, respectively, with respect to each lens region;
    a selector to select any one of the first and second voltage sources so as to apply voltages to the first electrodes;
    a controller to control the selector that selects any one of the first and second voltage sources; and
    metal lines provided at an edge region of the first substrate, to come into contact with the respective first electrodes per a lens region,
    wherein the metal lines are connected with the selector.

9. The device according to claim 8, wherein the controller is manually controlled.

10. The device according to claim 8, wherein the controller controls the selector to select the first voltage source or second voltage source according to 3-dimensional depth information of an image to be displayed.

11. The device according to claim 8, wherein the controller controls the selector to select the first voltage source or second voltage source according to distance information between the electrically-driven liquid crystal lens and a viewer.

12. The device according to claim 8, wherein the first and second voltage sources have resistor arrays, respectively, and apply first and second voltages having a voltage difference to the respective resistor arrays so as to output distributed voltages corresponding to the number of the metal lines.

13. The device according to claim 12, further comprising:
    a voltage level regulator to regulate the level of a larger one of the first and second voltages.

* * * * *